United States Patent [19]

Janotik et al.

[11] Patent Number: 5,338,080
[45] Date of Patent: Aug. 16, 1994

[54] SPACE FRAME CONSTRUCTION

[75] Inventors: Adam M. Janotik, Grosse Ile; Lawrence P. Kazyak, Novi, both of Mich.

[73] Assignee: Ford Motor Company, Dearborn, Mich.

[21] Appl. No.: 52,215

[22] Filed: Apr. 22, 1993

Related U.S. Application Data

[63] Continuation of Ser. No. 875,470, Apr. 29, 1992, abandoned.

[51] Int. Cl.$^5$ ............................................. B62D 27/00
[52] U.S. Cl. .......................................... 296/29; 296/30; 296/197; 296/203; 296/204; 296/205; 296/209; 52/282.4; 52/731.3; 52/731.6; 280/785; 403/205; 403/267; 403/274
[58] Field of Search ..................... 52/282.1–282.5, 52/730.1–730.7, 731.1–731.9, 732.1–732.3, 280, 281, 282, 730, 731, 732; 280/785, 797, 798, 800; 296/29, 30, 197, 203, 204, 205, 209, 900; 403/205, 265, 267, 274, 292, 298, 381, 382, 403

[56] References Cited

U.S. PATENT DOCUMENTS

| | | | |
|---|---|---|---|
| 1,972,309 | 9/1934 | McMurchy | 403/335 |
| 2,016,702 | 10/1935 | Bauer | 403/237 |
| 2,479,578 | 8/1949 | Langvand | 285/155 |
| 2,640,443 | 6/1953 | Schieler et al. | 105/404 |
| 3,093,219 | 6/1963 | Ramme | 138/117 |
| 3,100,556 | 8/1963 | De Ridder | 52/588 |
| 3,127,213 | 3/1964 | Klaasen | 296/197 |
| 3,132,883 | 5/1964 | Tantlinger et al. | 220/23.83 |
| 3,228,717 | 1/1966 | Waller et al. | 292/70 |
| 3,472,301 | 10/1969 | Pearce, Jr. | 411/258 |
| 3,797,194 | 3/1974 | Ekstein | 403/274 X |
| 4,230,361 | 10/1980 | Nachbur et al. | 296/193 |
| 4,471,519 | 9/1984 | Capello et al. | 29/460 |
| 4,554,718 | 11/1985 | Ollinger et al. | 29/469.5 |
| 4,557,091 | 12/1985 | Auer | 52/282 |
| 4,618,163 | 10/1986 | Hasler et al. | 280/785 |
| 4,660,345 | 4/1987 | Browning | 52/648 |
| 4,714,367 | 12/1987 | Baus | 403/205 X |
| 4,722,619 | 2/1988 | Reiser et al. | 384/585 |
| 4,759,489 | 7/1988 | Pigott | 228/102 |
| 4,912,826 | 4/1990 | Dixon et al. | 29/281.1 |
| 4,976,490 | 12/1990 | Gentle | 296/183 |
| 4,986,597 | 1/1991 | Clausen | 296/205 |
| 5,042,395 | 8/1991 | Wackerle et al. | 296/197 X |
| 5,072,655 | 12/1991 | Adler | 403/274 X |
| 5,131,714 | 7/1992 | Evans, Sr. et al. | 296/203 X |
| 5,143,416 | 9/1992 | Karapetian | 296/209 X |

FOREIGN PATENT DOCUMENTS

| | | | |
|---|---|---|---|
| 683437 | 3/1964 | Canada . | |
| 0061994 | 2/1982 | European Pat. Off. | 296/187 |
| 0240470 | 3/1987 | European Pat. Off. | 296/197 |
| 0271137 | 11/1987 | European Pat. Off. | 296/191 |
| 2935158 | 3/1980 | Fed. Rep. of Germany | 296/187 |
| 3811427 | 10/1989 | Fed. Rep. of Germany | 296/205 |
| 1497184 | 8/1967 | France | 296/197 |
| 87769 | 6/1982 | Japan | 296/197 |
| 04679 | 8/1987 | PCT Int'l Appl. | 296/203 |
| 2680 | 3/1990 | PCT Int'l Appl. . | |

Primary Examiner—David M. Mitchell
Assistant Examiner—Andrew C. Pike
Attorney, Agent, or Firm—Daniel M. Stock; Roger L. May

[57] ABSTRACT

A space frame for an automotive vehicle includes at least one longitudinally extending structural member and at least one rocker including a structure forming channels on at least two sides, one of the channels receiving the structural member and an adhesive and/or sleeve for securing the structural member to the rocker.

10 Claims, 2 Drawing Sheets

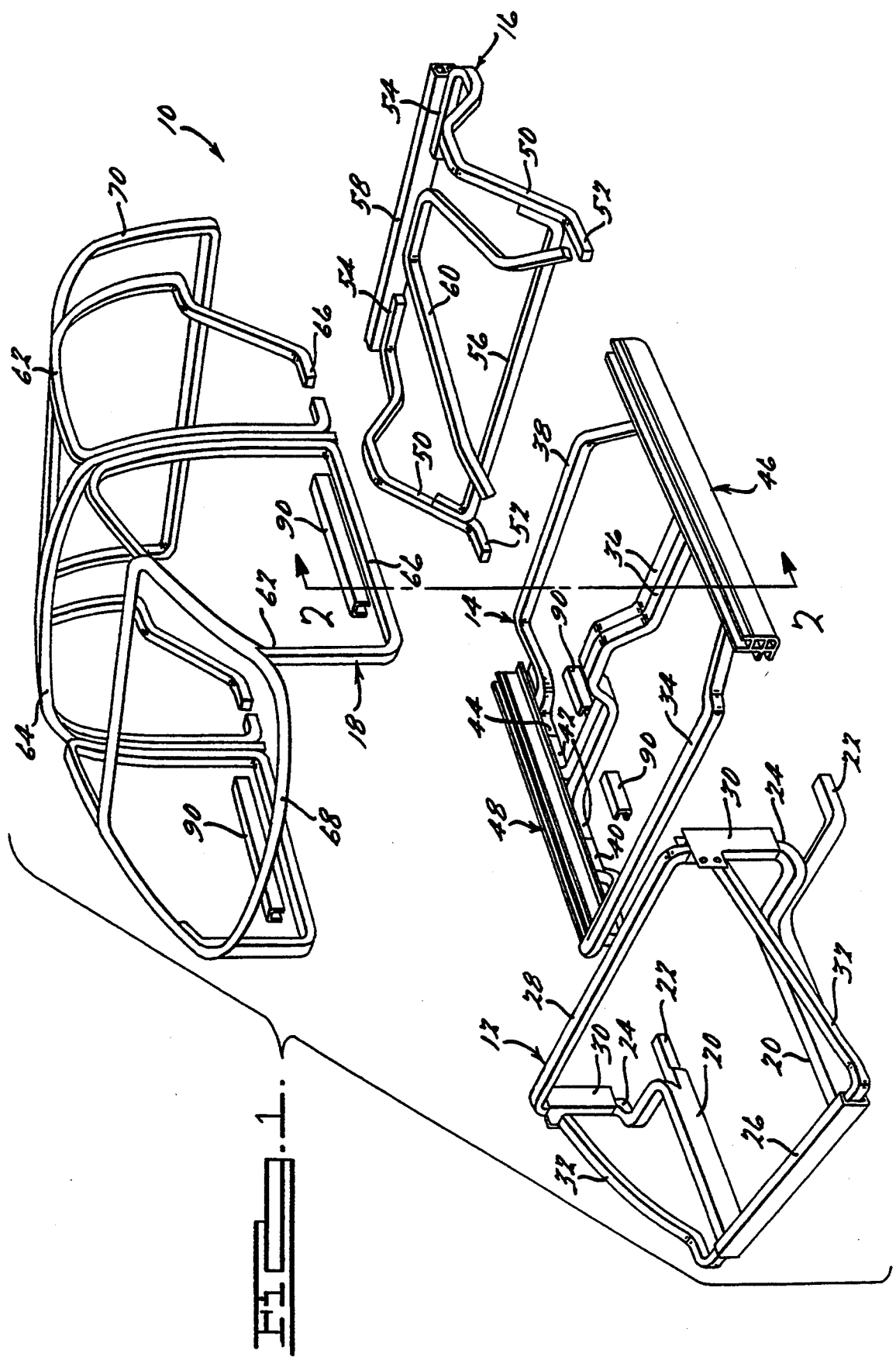

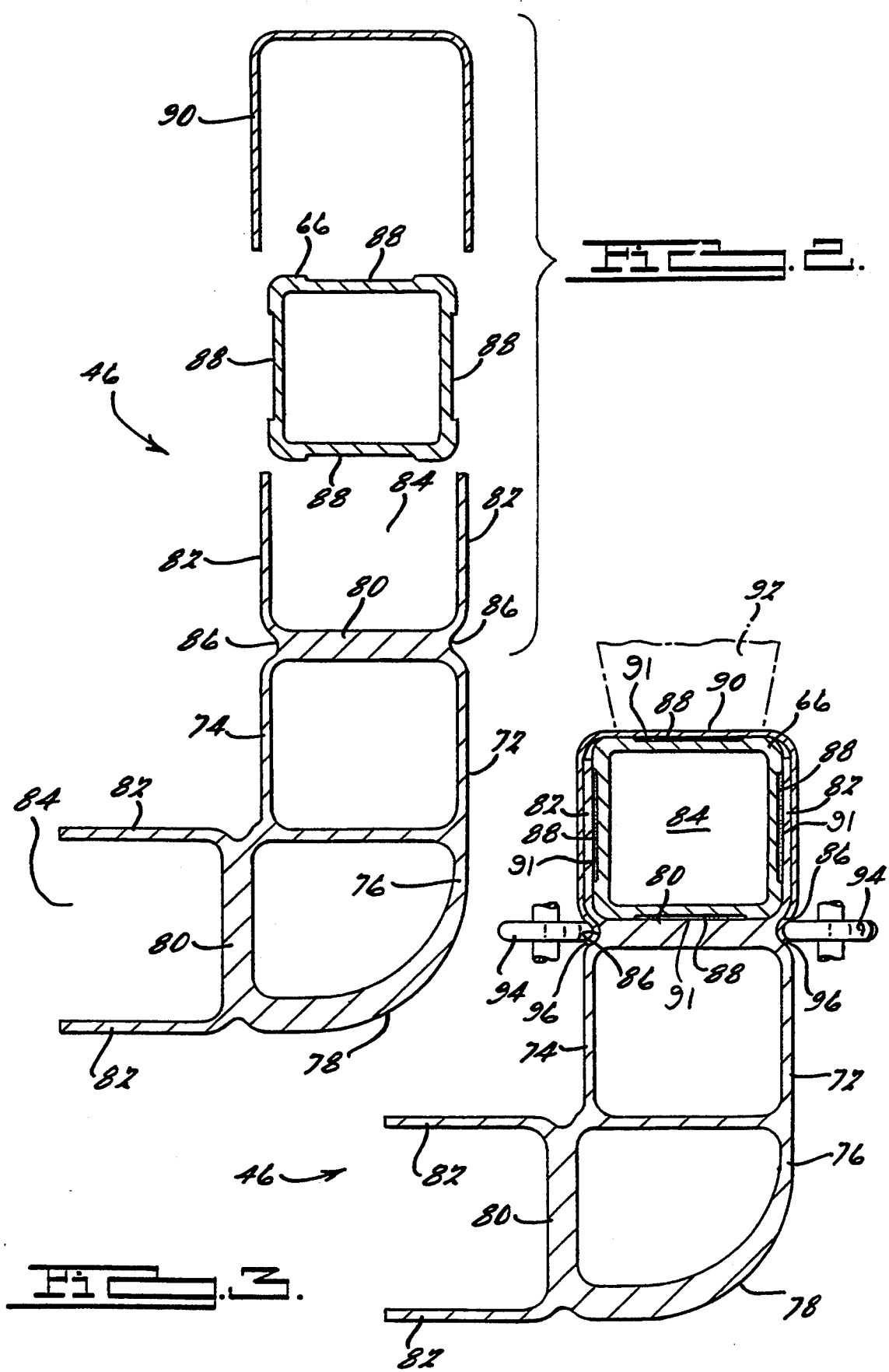

SPACE FRAME CONSTRUCTION

This is a continuation of U.S. patent application Ser. No. 07/875,470, filed Apr. 29, 1992, now abandoned.

BACKGROUND OF THE INVENTION

1. Field Of the Invention

The present invention relates generally to frame structures for automotive vehicles and more specifically to the construction of such frames from tubular members.

2. Description Of the Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frame."

It is known to fabricate such space frames from a number of tubular members that are joined by fixed connectors to define the general shape of the vehicle. While this approach provides a distinct advantage in weight and in the tooling cost of manufacturing over the conventional fabrication of unibody construction through massive stampings, it suffers from the disadvantage that the connectors utilized for joining the tubular members together tend to be massive and expensive to fabricate and assemble. This approach also suffers from the disadvantage that it is not flexible to allow frequent component changes. Further, this approach suffers from the disadvantage of not allowing for common and interchangeable components between various automotive model lines.

SUMMARY OF THE INVENTION

Accordingly, the present invention is a rocker for a space frame on an automobile vehicle. The rocker includes at least one elongated cell and means forming a channel on at least two sides of the elongated cell adapted to receive structural members of the space frame.

Also, the present invention is a space frame for an automotive vehicle. The space frame includes at least one longitudinally extending structural member and at least one rocker having means forming at least one channel adapted to receive the structural member. The space frame also includes means for securing the structural member to the rocker.

Additionally, the present invention is a method of constructing a space frame for an automotive vehicle. The method includes the steps of forming at least one longitudinally extending structural member and a rocker with at least one channel. The method also includes the steps of disposing the structural member in the channel and securing the structural member to the rocker.

One advantage of the present invention is that a rocker and space frame are provided for an automobile vehicle. Another advantage of the present invention is that the rocker allows automotive subassemblies to be assembled together to form the space frame. Yet another advantage of the present invention is that manufacturing flexibility is provided by allowing fabrication of the space frame with either an aluminum or steel material. Still another advantage of the present invention is that manufacturing flexibility is provided to the space frame by allowing inexpensive component changes, high commonality and interchangeability between automotive model lines. A further advantage of the present invention is that the space frame eliminates fixed connectors for joining individual space frame members. A still further advantage of the present invention is that the space frame reduces facilities and tooling investment to a fraction of traditional levels resulting in lower cost of fabrication and assembly.

Other objects, features, and advantages of the present invention will be readily appreciated as the same becomes better understood after reading the following description taken in light of the accompanying drawings.

BRIEF DESCRIPTION OF THE DRAWINGS

FIG. 1 is an exploded perspective view of a space frame according to the present invention.

FIG. 2 is an exploded sectional view of a rocker assembly, according to the present invention, taken along line 2—2 of FIG. 1.

FIG. 3 is a view similar to FIG. 2 illustrating the rocker assembly partially assembled.

DESCRIPTION OF THE PREFERRED EMBODIMENT(S)

Turning now to the drawings and in particular to FIG. 1 thereof, a space frame 10 according to the present invention is illustrated for an automotive vehicle. The space frame 10 includes a front structural subassembly, generally indicated at 12, a center structural subassembly, generally indicated at 14, a rear structural subassembly, generally indicated at 16, and a greenhouse structural subassembly, generally indicated at 18. It should be appreciated that the structural subassemblies 12, 14, 16, 18 are assembled to form an assembled space frame 10 as will be described.

The front structural subassembly 12 includes longitudinally extending side rails 20. One end of the side rails 20 have longitudinally extending extensions 22 and vertically extending pillar members 24. The front structural subassembly 12 also includes an end cross member 26 connected to the other end of the side rails 20 and a laterally extending upper cross member 28 connected to the pillar members 24 by a sleeve member 30. The front structural subassembly 12 further includes inclined members 32 interconnecting the end cross member 26 and the pillar members 24. The front structural subassembly 12 may include other members to support an automotive engine and its associated componentry (not shown).

The center structural subassembly 14 includes front, center, and rear cross members 34, 36, 38 each having longitudinally extending extensions 40, 42, 44, respectively. The center structural subassembly 14 also includes a pair of rocker assemblies, generally indicated at 46 and 48, connecting or joining the cross members 34, 36, 38 together. The rocker assemblies 46 and 48 also connect or join the front structural subassembly 12, rear structural subassembly 16, and greenhouse structural subassembly 18 to the center structural subassembly 14 as will be described.

The rear structural subassembly 16 includes longitudinally and vertically extending side rails 50 having a longitudinally extending extension 52 at one end and a laterally extending extension 54 at the other end. The rear structural subassembly 16 also includes laterally extending front and rear cross members 56, 58 interconnecting the side rails 50. The rear structural subassembly 16 further includes a generally V-shaped support member 60 interconnecting the front and rear cross members 56, 58.

The greenhouse structural subassembly 18 includes hoop-shaped side members 62 connected adjacent an inverted U-shaped center cross member 64. The side members 62 having a longitudinally extending lower member 66. The greenhouse structural subassembly 18 includes hoop-shaped front and rear members 68 and 70 interconnecting the side members 62.

The space frame 10 may include other structural members which are not specifically described to form the space frame 10 illustrated in FIG. 1. The structural members are pre-assembled into the structural subassemblies 12, 14, 16, 18 using suitable means such as welding or an adhesive to be described. The structural members of the space frame 10 are tubular members extruded from a metal material such as an aluminum or steel material. Preferably, the tubular members have a generally rectangular cross section. It should be appreciated that other suitable materials and cross-sectional shapes may be used.

Referring to FIGS. 1 and 2, the rocker assemblies 46, 48 include a rocker member or rocker 72. The rocker 72 is identical for the rocker assemblies 46, 48, except one is left-handed and the other is right-handed. As a result, only the rocker assembly 46 will be specifically described. The rocker 72 includes at least one, preferably a plurality of elongated cells 74, 76. The elongated cells 74, 76 are arranged vertically, but may be arranged horizontally or a combination thereof. The elongated cells 74, 76 are generally tubular and rectangular in cross-sectional shape. The elongated cell 76 which acts as a corner may have an arcuate outer surface 78 if desired.

The rocker 72 also includes a base wall 80 on at least two sides of the rocker 72, preferably one on each of the elongated cells 74, 76. The rocker 72 further includes a pair of side walls 82 connected to the base wall 80. The side walls 82 are spaced and substantially parallel to each other. The side walls 82 and base walls 80 cooperate to form generally rectangularly shaped channels 84. The channels 84 are orientated at an angle of ninety degrees (90°) relative to each other. The rocker 72 may also include longitudinally extending grooves 86 extending inwardly from an outer surface where the base wall 80 and elongated cell 74, 76 intersect. Preferably, the base walls 80, side walls 82 and elongated cells 74, 76 are integral and formed as one-piece. Preferably, the rocker 72 is extruded from a metal material such as an aluminum or steel material. It should be appreciated that other suitable cross-sectional shapes and materials may be used.

The rocker assembly 46, 48 also includes at least one, preferably a plurality of recesses or pockets on the structural member to be disposed in the channel 84. As illustrated in FIGS. 2 and 3, the lower member 66 of the side members 62 includes at least one pocket 88 on each side of the lower member 66 for a function to be described.

The rocker assembly 46, 48 further includes a longitudinally extending sleeve 90 having an inverted U-shaped cross section. The sleeve 90 is adapted to be disposed over the structural member in the channel 84 and the side walls 82 of the rocker 72 for a function to be described. The sleeve 90 is extruded from a metal material such as an aluminum or steel material. It should be appreciated that other suitable cross-sectional shapes and materials may be used.

In operation, the structural members of the space frame 10 are extruded as straight sections. The structural members are then formed or bent as illustrated in FIG. 1 using conventional equipment and methods. The structural members of the space frame 10 are joined or connected to each other preferably with an adhesive 91 such as a structural adhesive. An example of such a structural adhesive is found under the trade name Versilok acrylic adhesive (AD5830) of the Lord Corporation. It should be appreciated that the structural members of the space frame 10 are pre-assembled to form the structural subassemblies 12, 14, 16, and 18 illustrated in FIG. 1.

As to the center structural subassembly 14, the method or sequence of construction or assembly will be specifically described. The front, center, and rear cross members 34, 36, 38 are automatically loaded into a fixture (not shown). Right-handed and left-handed rockers 72 are placed with the channels 84 adjacent the elongated cell 76 facing upward to accept the adhesive. An operator or a device such as a robot (not shown) applies a bead of adhesive into the channels 84. The rockers 72 are automatically rotated ninety degrees (90°) to orient the channels 84 with the adhesive toward the extensions 40, 42, 44 of the cross members 34, 36, 38. The rockers 72 are moved inboard over extensions 40, 42, 44 and adhesive is back-extruded into the pockets 88 on the extensions 40, 42, 44. The sleeves 90 are placed over the extensions 40, 42, 44 disposed in the channels 84 and over the side walls 82 of the rockers 72. The sleeves 90 are secured to the rockers 72 by suitable means such as a crimping fixture anvil 92 and crimping roller 94 to form a projection 96 on both sides to engage the grooves 86. The center structural subassembly 14 is then released to continue assembly of the space frame 10, without waiting for the adhesive to develop handling strength. It should be appreciated that the sleeve 90 and rocker 72 form a mechanical interlock therebetween.

Accordingly, the front structural subassembly 12 and rear structural subassembly 16 are joined or connected to the center structural subassembly 14 in a similar manner. Using a framing buck (not shown), the extensions 22 and 52 are moved inboard into the channel 84 which already has adhesive disposed therein and/or adhesive is back-extruded into pockets 88 on the extensions 22 and 52. The sleeves 90 are placed over the extensions 22 and 55 disposed in the channels 84 and over the side walls 82 of the rockers 72. The sleeves 90 are secured to the rockers 72 as above-described.

Further, the greenhouse structural subassembly 18 is joined or connected to the center structural subassembly 14 in a similar manner. An operator or device such as a robot (not shown) applies a bead of adhesive into the channels 84 adjacent the elongated cell 74 which faces upward. The greenhouse structural subassembly 18 is lowered to dispose the lower members 66 into the channels 84 and adhesive is back-extruded into the pockets 88 on the lower members 66. The sleeves 90 are placed over the lower members 66 disposed in the channels 84 and over the side walls 82 of the rockers 72. The sleeves 90 are secured to the rockers 72 as above-described.

Accordingly, the space frame 10 allows the front, center, and rear structural subassemblies to be identical for all vehicle models. Three distinct greenhouse structural subassemblies 18 (3-door, 5-door, and van) are assembled to the center structural subassembly 14 merely by changing the length of the rockers 72. The space frame 10 allows the subassemblies to be joined by the rocker assemblies 46 and 48 with means of adhesive bonding and/or mechanical interlocking.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A space frame for an automotive vehicle comprising:
   at least one longitudinally extending structural member;
   at least one rocker including a plurality of generally rectangular-shaped elongated cells and generally U-shaped channels on at least two of said elongated cells, said channels being orientated at an angle of substantially ninety degrees relative to each other, said structural member being disposed in one of said channels; and
   means for securing said structural member to said rocker.

2. A space frame as set forth in claim 1 wherein said securing means comprises an adhesive disposed between the one of said channels and said structural member.

3. A space frame as set forth in claim 1 wherein each of said channels comprises a pair of side walls spaced from and substantially parallel to each other and a base wall interconnecting said side walls and one of said elongated cells.

4. A space frame as set forth in claim 3 wherein said structural member includes at least one pocket on one side thereof.

5. A space frame as set forth in claim 4 wherein said securing means comprises an adhesive disposed in the one of said channels and said pocket between said base and side walls.

6. A space frame for an automotive vehicle comprising:
   at least one longitudinally extending structural member;
   at least one rocker including a plurality of elongated cells and channels on at least two of said elongated cells, said channels being oriented at an angle of substantially ninety degrees relative to each other, said structural member being disposed in one of said channels; and
   means for securing said structural member to said rocker;
   wherein said securing means comprises a sleeve disposed over said structural member and the one of said channels and secured to said rocker.

7. A space frame for an automotive vehicle comprising:
   at least one longitudinally extending structural member;
   at least one rocker including a plurality of elongated cells and channels on at least two of said elongated cells, said channels being oriented at an angle of substantially ninety degrees relative to each other, said structural member being disposed in one of said channels; and
   means for securing said structural member to said rocker;
   said securing means comprising a sleeve disposed over said structural member and the one of said channels and secured to said rocker;
   wherein said securing means further comprises grooves on opposed sides of said rocker, and said sleeve has projections to engage said grooves.

8. A space frame for an automotive vehicle comprising:
   a plurality of longitudinally extending structural members;
   at least one rocker including generally U-shaped channels on at least two sides, said channels being orientated at an angle substantially ninety degrees relative to each other, at least one of said structural members being disposed in one of said channels;
   said rocker comprising a plurality of generally rectangular-shaped elongated cells and said channels comprising a pair of side walls spaced and substantially parallel to each other and a base wall interconnecting said side walls and one of said elongated cells; and
   an adhesive disposed in the one of said channels between said base and side walls for securing the at least one of said structural members to said rocker.

9. A space frame for an automotive vehicle comprising:
   a plurality of longitudinally extending structural members;
   at least one rocker including channels on at least two sides, said channels being orientated at an angle substantially ninety degrees relative to each other, at least one of said structural members being disposed in one of said channels;
   said rocker comprising a plurality of elongated cells and said channels comprising a pair of side walls spaced and substantially parallel to each other and a base wall interconnecting said side walls and one of said elongated cells;
   a sleeve disposed over the at least one of said structural members and the one of said channels; and
   said rocker having grooves on opposed sides thereof, and said sleeve having projections to engage said grooves.

10. A space frame for an automotive vehicle comprising:
   a plurality of longitudinally extending structural members;
   at least one rocker including channels on at least two sides, said channels being orientated at an angle substantially ninety degrees relative to each other, at least one of said structural members being disposed in one of said channels;
   said rocker comprising a plurality of elongated cells and said channels comprising a pair of side walls spaced and substantially parallel to each other and a base wall interconnecting said side walls and one of said elongated cells;
   an adhesive disposed in the one of said channels between said base and side walls; and
   a sleeve disposed over the at least one of said structural members and the one of said channels.

* * * * *